(12) United States Patent
Nakaishi

(10) Patent No.: US 10,033,053 B2
(45) Date of Patent: Jul. 24, 2018

(54) FLOW BATTERY AND SUPPLY/DISCHARGE PLATE OF FLOW BATTERY

(71) Applicant: Sumitomo Electric Industries, Ltd., Osaka-shi (JP)

(72) Inventor: Hiroyuki Nakaishi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 302 days.

(21) Appl. No.: 15/028,789

(22) PCT Filed: Oct. 3, 2014

(86) PCT No.: PCT/JP2014/076519
§ 371 (c)(1),
(2) Date: Apr. 12, 2016

(87) PCT Pub. No.: WO2015/060099
PCT Pub. Date: Apr. 30, 2015

(65) Prior Publication Data
US 2016/0254551 A1    Sep. 1, 2016

(30) Foreign Application Priority Data

Oct. 23, 2013  (JP) ................................ 2013-220668

(51) Int. Cl.
*H01M 4/64*      (2006.01)
*H01M 8/0258*    (2016.01)
(Continued)

(52) U.S. Cl.
CPC ....... *H01M 8/0258* (2013.01); *H01M 8/0202* (2013.01); *H01M 8/188* (2013.01);
(Continued)

(58) Field of Classification Search
CPC ..................................................... H01M 4/64
See application file for complete search history.

(56) References Cited

U.S. PATENT DOCUMENTS

| 2008/0081247 A1 | 4/2008 | Nakaishi et al. |
| 2013/0157097 A1* | 6/2013 | Kampanatsanyakorn ................. H01M 8/0273 429/105 |

FOREIGN PATENT DOCUMENTS

| JP | 11-329474 A | 11/1999 |
| JP | 2001-189156 A | 7/2001 |

(Continued)

OTHER PUBLICATIONS

International Search Report in PCT International Application No. PCT/JP2014/076519, dated Nov. 4, 2014.
(Continued)

*Primary Examiner* — Jacob Marks
(74) *Attorney, Agent, or Firm* — Venable LLP; Michael A. Sartori; Miguel A. Lopez

(57) ABSTRACT

A flow battery includes a cell, a bipolar plate which is in contact with one of a positive electrode and a negative electrode constituting the cell, a current collector plate which has a terminal portion that is led out to the outside of the cell and is electrically connected to the bipolar plate, and a supply/discharge plate which is stacked on the current collector plate and supplies and discharges electrolytes to and from the cell. When the side of the supply/discharge plate facing the current collector plate is regarded as a front surface and the side opposite thereto is regarded as a back surface, the supply/discharge plate has an insertion hole which passes between the front surface and the back surface thereof and into which the terminal portion is inserted, and the terminal portion passes through the insertion hole and extends from the front surface side to the back surface side of the supply/discharge plate to be led out.

7 Claims, 7 Drawing Sheets

230: 231, 232, 233, 234

(51) Int. Cl.
*H01M 8/18* (2006.01)
*H01M 8/0202* (2016.01)
*H01M 8/20* (2006.01)
*H01M 8/248* (2016.01)

(52) U.S. Cl.
CPC .............. *H01M 8/20* (2013.01); *H01M 8/248* (2013.01); *Y02E 60/528* (2013.01)

(56) References Cited

FOREIGN PATENT DOCUMENTS

| | | |
|---|---|---|
| JP | 2002-184424 A | 6/2002 |
| JP | 2006-324116 A | 11/2006 |
| JP | 2006-351345 A | 12/2006 |
| JP | 2012-104237 A | 5/2012 |
| JP | 2012-119288 A | 6/2012 |
| JP | 2012-216510 A | 11/2012 |
| WO | WO-2012/133747 A1 | 10/2012 |

OTHER PUBLICATIONS

Extended European Search Report in European Patent Application No. 14856587.2, dated Aug. 9, 2016.

* cited by examiner

FLOW BATTERY AND SUPPLY/DISCHARGE PLATE OF FLOW BATTERY

TECHNICAL FIELD

The present invention relates to a flow battery such as a redox flow battery, and a supply/discharge plate of a flow battery for supplying and discharging electrolytes to and from a cell of the flow battery. In particular, the invention relates to a flow battery in which, even when an electrolyte leaks, the electrolyte that has leaked is unlikely to come into contact with a terminal portion of a current collector plate which inputs and outputs electricity to and from an external device.

BACKGROUND ART

A flow battery such as a redox flow battery (RF battery) is a large-capacity storage battery that stores power derived from natural energy obtained by solar power generation, wind power generation, or the like. An RF battery performs charging and discharging using the difference in oxidation reduction potential between ions contained in a positive electrode electrolyte and ions contained in a negative electrode electrolyte.

As shown in an operating principle diagram of FIG. 6 for an RF battery, an RF battery 1 includes a cell 100 which is separated into a positive electrode cell 102 and a negative electrode cell 103 by a membrane 101 that permeates hydrogen ions. The positive electrode cell 102 contains a positive electrode 104 and is connected via a supply duct 108 and a discharge duct 110 to a positive electrode electrolyte tank 106 that stores a positive electrode electrolyte. Similarly, the negative electrode cell 103 contains a negative electrode 105 and is connected via a supply duct 109 and a discharge duct 111 to a negative electrode electrolyte tank 107 that stores a negative electrode electrolyte. The electrolytes stored in the tanks 106 and 107 are circulated within the cells 102 and 103 by pumps 112 and 113, respectively.

As shown in FIG. 7, the RF battery 1 usually includes a cell stack 200 in which a plurality of stacked sub-cell stacks 200s are sandwiched between two end plates 210 and 220 and fastened with a fastening mechanism 230. The sub-cell stack 200s includes a stacked body formed by stacking a frame assembly 120 which includes a bipolar plate 121 and a frame piece 122 that holds the bipolar plate 121, a positive electrode 104, a membrane 101, and a negative electrode 105 in this order. In this configuration, a cell 100 is formed between the bipolar plates 121 of the adjacent frame assemblies 120. Integration between the bipolar plate 121 and the frame piece 122 is performed by holding the periphery of the bipolar plate 121 between a pair of divided frames, welding the divided frames together using an organic solvent to form a frame piece 122, and welding the frame piece 122 and the bipolar plate 121 (for example, refer to paragraph 0028 of Patent Literature 1).

Furthermore, the sub-cell stack 200s includes a pair of current collector plates disposed on both sides of the stacked body and a pair of supply/discharge plates 201 disposed on the pair of current collector plates. The current collector plates are electrically connected to the bipolar plates 121 located at both ends in the stacking direction of the stacked body. A terminal portion protrudes outward from the periphery of the current collector plate between the pair of supply/discharge plates 201 (between the supply/discharge plate 201 and the end bipolar plate 121). Input and output of electricity between the cell 100 of the sub-cell stack 200s and an external device are performed through the terminal portion. Each supply/discharge plate 201 is provided with a supply pipe 202i to be connected to the supply duct 108 (109) and a discharge pipe 202o to be connected to the discharge duct 110 (111). The electrolytes are circulated between the sub-cell stack 200s and the tanks 106 and 107 through the pipes 202i and 202o, respectively.

In the sub-cell stack 200s, circulation of the electrolytes is performed by using liquid supply manifolds 123 and 124 and liquid discharge manifolds 125 and 126 which are provided on the frame piece 122. The positive electrode electrolyte is supplied from the liquid supply manifold 123 through a channel formed on one surface side (front side of the sheet) of the frame piece 122 to the positive electrode 104, and is discharged through a channel formed on the upper part of the frame piece 122 to the liquid discharge manifold 125. Similarly, the negative electrode electrolyte is supplied from the liquid supply manifold 124 through a channel formed on the other surface side (back side of the sheet) of the frame piece 122 to the negative electrode 105, and is discharged through a channel formed on the upper part of the frame piece 122 to the liquid discharge manifold 126. Ring-shaped sealing members 127, such as O-rings and flat packings, are disposed between the frame pieces 122 so that leakage of the electrolytes from the sub-cell stack 200s can be prevented.

CITATION LIST

Patent Literature

PTL 1: Japanese Unexamined Patent Application Publication No. 2001-189156

SUMMARY OF INVENTION

Technical Problem

The sealing member disposed between the frame pieces constituting cells is soft and long string-like, and is likely to lack definite shape. Therefore, the sealing member may be difficult to handle in some cases. Accordingly, there is a possibility that the sealing performance between the frame pieces will become insufficient, and electrolytes may leak between the frame pieces. Since the terminal portion of the current collector plate extends along the front surface of the supply/discharge plate and is led out to the outside of the cell between the supply/discharge plate and the frame assembly adjacent to the supply/discharge plate (hereinafter, referred to as the end frame assembly), only one end frame assembly, at the most, is interposed between the terminal portion and the nearest cell. Therefore, the distance between the terminal portion and the nearest cell is small, and when an electrolyte leaks, the electrolyte that has leaked is likely to come into contact with the terminal portion.

Furthermore, in the frame piece constituting the existing end frame assembly, a recess is formed at a position facing the terminal portion, and by partially fitting the terminal portion in the recess, the terminal portion is led out between the supply/discharge plate and the end frame assembly. Furthermore, since a ring-shaped groove for fitting the periphery of the bipolar plate is formed in the inner periphery of the divided frame on the bonding surface side, the thickness thereof is small. The thickness of the frame piece is generally smaller than the thickness of the supply/discharge plate, and in particular, the thickness of a portion of the divided frame sandwiched between the terminal portion and the bipolar plate is very small. Therefore, there is a possibility that the mechanical strength against the inward fastening force in the stacking direction of the cell stack will become insufficient.

Furthermore, in the case where the existing cell stack includes a plurality of stacked sub-cell stacks, there are a pair of supply/discharge plates whose surfaces on the side opposite the corresponding current collector plate are in contact with each other. In this case, since two supply/discharge plates are interposed between the terminal portions each led out between the supply/discharge plate and the end frame assembly, the distance between the terminal portions increases. Therefore, it is difficult to directly connect the terminal portions to each other, and bridge fittings for connecting the terminal portions are required, and thus the operation of connecting the terminal portions to each other becomes complicated.

The present invention has been achieved under the circumstances described above. It is an object of the present invention to provide a flow battery in which, even when an electrolyte leaks, the electrolyte that has leaked is unlikely to come into contact with a terminal portion of a current collector plate which inputs and outputs electricity to and from an external device.

It is another object of the present invention to provide a flow battery which has a sufficient mechanical strength against the inward fastening force in the stacking direction of constituent members of the flow battery.

It is another object of the present invention to provide a flow battery in which the operation of connecting terminals to each other can be performed easily.

It is another object of the present invention to provide a supply/discharge plate of a flow battery which can construct the flow battery described above.

Solution to Problem

A flow battery according to the present invention includes a cell, a bipolar plate, a current collector plate, and a supply/discharge plate. The bipolar plate is in contact with one of a positive electrode and a negative electrode constituting the cell. The current collector plate has a terminal portion that is led out to the outside of the cell and is electrically connected to the bipolar plate. The supply/discharge plate is stacked on the current collector plate and supplies and discharges electrolytes to and from the cell. The supply/discharge plate has an insertion hole which passes between the front surface and the back surface thereof and into which the terminal portion is inserted. The terminal portion passes through the insertion hole and extends from the front surface side to the back surface side of the supply/discharge plate to be led out. Herein, the side of the supply/discharge plate facing the current collector plate is regarded as the front surface and the side opposite thereto is regarded as the back surface.

A supply/discharge plate of a flow battery according to the present invention is stacked on a current collector plate having a terminal portion that inputs and outputs electricity between a cell and an external device, and supplies and discharges electrolytes to and from the cell. The supply/discharge plate has an insertion hole which passes between the front surface and the back surface thereof and into which the terminal portion is inserted so as to extend from the front surface side to the back surface side to be led out. Herein, the surface of the supply/discharge plate facing the current collector plate is regarded as the front surface and the surface opposite thereto is regarded as the back surface.

Advantageous Effects of Invention

In the flow battery according to the present invention, even when an electrolyte leaks, the electrolyte that has leaked is unlikely to come into contact with a terminal portion of a current collector plate which inputs and outputs electricity to and from an external device.

In the supply/discharge plate of a flow battery according to the present invention, it is possible to construct a flow battery in which, even when an electrolyte leaks, the electrolyte that has leaked is unlikely to come into contact with a terminal portion of a current collector plate which inputs and outputs electricity to and from an external device.

DESCRIPTION OF EMBODIMENTS

Figure 1:
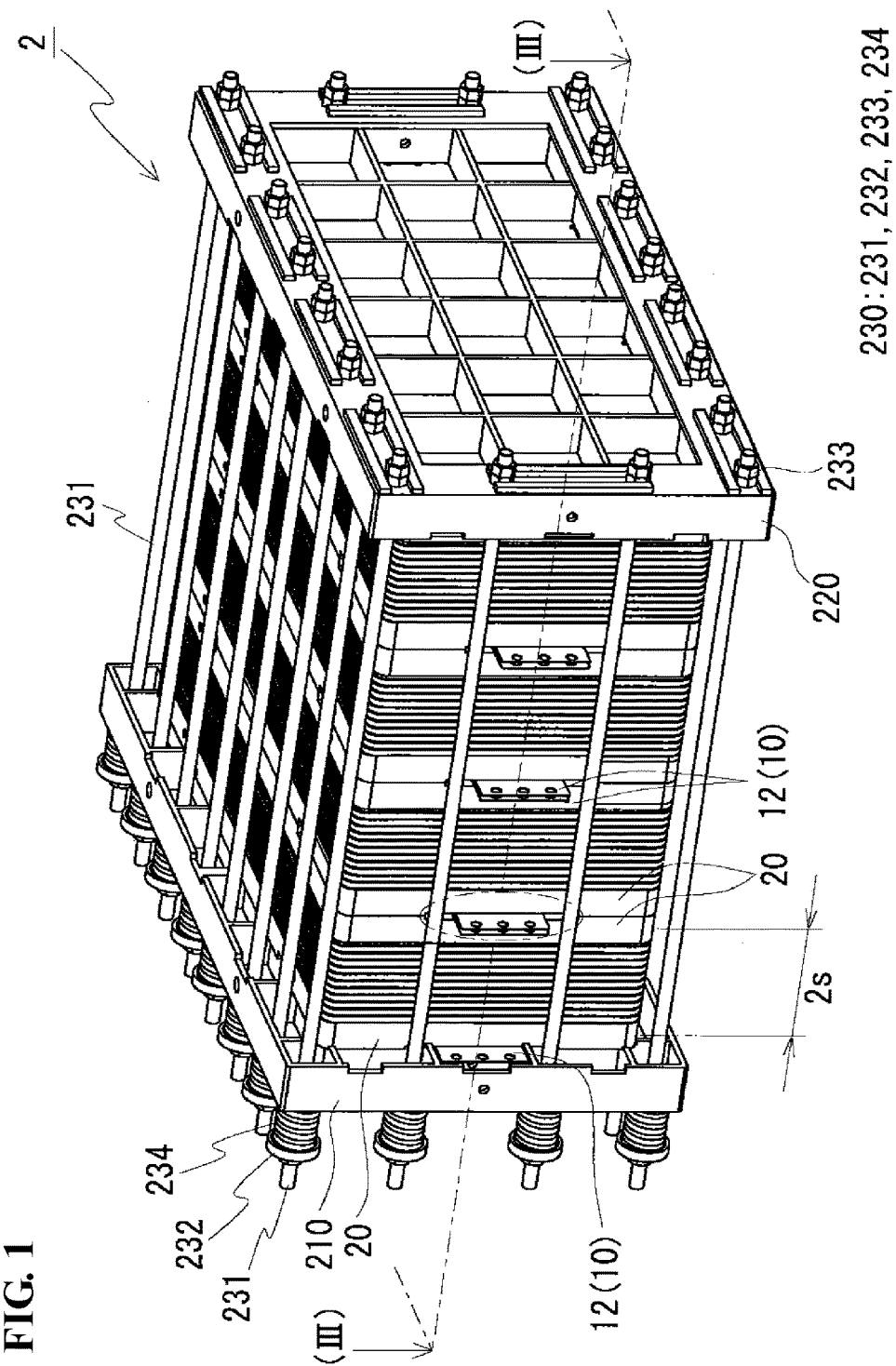
FIG. 1 is a schematic perspective view showing a cell stack provided in a redox flow battery according to an embodiment.

Description of Embodiments of the Present Invention

First, contents of embodiments of the present invention are enumerated and described.

(1) A flow battery according to an embodiment includes a cell, a bipolar plate, a current collector plate, and a supply/discharge plate. The bipolar plate is in contact with one of a positive electrode and a negative electrode constituting the cell. The current collector plate has a terminal portion that is led out to the outside of the cell, and is electrically connected to the bipolar plate. The supply/discharge plate is stacked on the current collector plate and supplies and discharges electrolytes to and from the cell. The supply/discharge plate has an insertion hole which passes between the front surface and the back surface thereof and into which the terminal portion is inserted. The terminal portion passes through the insertion hole and extends from the front surface side to the back surface side of the supply/discharge plate to be led out. Herein, the side of the supply/discharge plate facing the current collector plate is regarded as the front surface and the side opposite thereto is regarded as the back surface.

In the configuration described above, even when an electrolyte leaks, the electrolyte that has leaked is unlikely to come into contact with the terminal portion of the current collector plate. Since the terminal portion extends from the front surface side to the back surface side of the supply/discharge plate to be led out, at least the supply/discharge plate is interposed between the terminal portion and the nearest cell. That is, in comparison with the case where the terminal portion extends along the front surface of the supply/discharge plate and is led out according to the existing technique, the distance between the terminal portion and the nearest cell increases.

Furthermore, the flow battery has a sufficient mechanical strength against the inward fastening force in the stacking direction of constituent members of the flow battery. The reason for this is that since the terminal portion extends from the front surface side to the back surface side of the supply/discharge plate to be led out, unlike the existing frame piece, it is not necessary to provide a recess for leading out the terminal portion, and the frame piece does not have a very thin portion locally.

(2) In the flow battery described above, the flow battery may include a plurality of cells and a pair of supply/discharge plates which are in contact with each other between the plurality of cells and supply and discharge electrolytes to and from different cells. In this case, terminal portions led out through insertion holes of the supply/discharge plates are in contact with each other.

In the configuration described above, the operation of connecting the terminal portions to each other can be simplified. Since the terminal portion extends from the front surface side to the back surface side of each supply/discharge plate, two supply/discharge plates do not lie between the terminal portions led out from the pair of supply/discharge plates unlike the existing case. Therefore, the terminal portions can be brought into contact with each other. Accordingly, bridge fittings for connecting the terminal portions are not required.

(3) In the flow battery described above, the supply/discharge plate may have a recess formed on the back surface thereof, the recess being continuous up to the insertion hole and extending from the insertion hole to the periphery of the supply/discharge plate. In this case, the terminal portion is partially fitted in the recess, and the top of the terminal portion is led out to the outside of the periphery.

In the configuration described above, because of the presence of the recess, the terminal portion can be easily led out to the outside of the periphery of the supply/discharge plate along the back surface of the supply/discharge plate. Furthermore, by partially fitting the terminal portion in the recess, the terminal portion is unlikely to protrude from the back surface of the supply/discharge plate. Therefore, for example, in the case where a plurality of sub-cell stacks are placed adjacent to each other and a pair of supply/discharge plates are in contact with each other, the terminal portions led out from the supply/discharge plates can be easily brought into contact with each other.

(4) In the flow battery described above, a frame that forms a ring-shaped groove for placing the periphery of the bipolar plate may be provided between the supply/discharge plate and the bipolar plate, and a ring-shaped packing composed of an elastic material may be placed in the ring-shaped groove and contact-pressed by the frame and the supply/discharge plate. The packing holds the periphery of the bipolar plate.

In the configuration described above, sealing can be provided by the packing between each of the current collector plate and the supply/discharge plate and the cell, and a welding operation, which is likely to depend on the skill of the operator compared with the case where the packing is used, is not required, therefore exhibiting excellent assembling performance. Furthermore, although the packing can be mounted on the periphery of the bipolar plate by a simple operation in which the packing is just expanded and fitted, yet the packing can be securely mounted without slipping off or coming off. Furthermore, since the ring-shaped packing composed of an elastic material is provided, the packing is deformed by being contact-pressed between each of the frame and the supply/discharge plate and the periphery of the bipolar plate and adheres closely to the frame, the supply/discharge plate, and the bipolar plate, and thus, it is possible to secure high sealing performance. Since the packing is composed of an elastic material, even when the bipolar plate is deformed or subjected to stress as the electrolytes are circulated, the packing expands and contracts, following the bipolar plate, and therefore is effective for relieving stress. Consequently, it is possible to suppress damage on the frame and the bipolar plate.

In the case where the terminal portion of the current collector plate is led out to the outside along the front surface of the supply/discharge plate between the supply/discharge plate and the end frame assembly according to the existing technique, as described above, a recess is formed in the frame piece of the end frame assembly at a position facing the terminal portion. In such a configuration, when a sealing structure using the packing described above is provided, it is difficult to apply a pressing force uniformly in the circumferential direction all around the packing. The terminal portion placed in the recess formed in the frame piece is partially in non-contact with the supply/discharge plate and the frame piece, and it is difficult to make the pressing force that fastens the cell stack to act on the packing sufficiently with the supply/discharge plate, the terminal portion, and the frame piece therebetween. Accordingly, in some cases, there may be a difference in the pressing force applied to the packing between the recessed portion of the frame piece and the rest of the frame piece. Specifically, the pressing force applied to the recessed portion of the frame piece is weaker than the pressing force applied to the rest of the frame piece. As a result, there is a possibility that the sealing performance will become insufficient at the portion of the packing facing the recess of the frame piece. Alternatively, when the pressing force is increased such that the sealing performance does not become insufficient, even though the sealing performance is increased, an excessive pressing force is applied to the portion of the packing other than the portion facing the recess of the frame, and the packing is likely to be partially deteriorated. As a result, there is a possibility that the sealing performance will become insufficient at the portion of the packing other than the portion facing the recess of the frame.

In contrast, in the configuration described above, since the terminal portion extends from the front surface side to the back surface side of the supply/discharge plate to be led out, unlike the existing frame piece, it is not necessary to provide a recess for leading out the terminal portion on the frame. That is, it is possible to bring the entire circumference of the frame into contact with the supply/discharge plate. Therefore, it is possible to apply the pressing force uniformly in the circumferential direction all around the packing.

(5) In the flow battery described above, in the case where the packing is provided, the supply/discharge plate may be provided with a protruding frame formed on the front surface thereof, the protruding frame positioning the packing.

In the configuration described above, because of the presence of the protruding frame, the packing can be easily positioned with respect to the supply/discharge plate. Therefore, when the flow battery is assembled, the packing can be easily placed with respect to the supply/discharge plate.

(6) In the flow battery described above, in the case where the packing and the protruding frame are provided, an elastic sheet may be interposed between the packing and the protruding frame in the circumferential direction all around the packing.

In the configuration described above, because of the presence of the elastic sheet, the lifetime of the packing is prolonged by decreasing the compression set of the packing, and the sealing performance by the packing can be maintained over a long period of time.

(7) A supply/discharge plate of a flow battery according to an embodiment is stacked on a current collector plate having a terminal portion that inputs and outputs electricity between a cell and an external device, and supplies and discharges electrolytes to and from the cell. The supply/discharge plate has an insertion hole which passes between the front surface and the back surface thereof and into which the terminal portion is inserted so as to extend from the front surface side to the back surface side to be led out. Herein, the side of the supply/discharge plate facing the current collector plate is regarded as the front surface and the side opposite thereto is regarded as the back surface.

In the configuration described above, it is possible to construct a flow battery in which, even when an electrolyte leaks, the electrolyte that has leaked is unlikely to come into contact with a terminal portion of a current collector plate.

Detailed Description of Embodiments of the Present Invention

Embodiments of the present invention will be described in detail below with reference to the drawings. It is intended that the present invention is not limited to the examples shown in the embodiments, but is determined by appended claims, and includes all variations of the equivalent meanings and ranges to the claims. Herein, a description will be made on a redox flow battery (RF battery) as an example of a flow battery.

[Redox Flow Battery]

Figure 6:
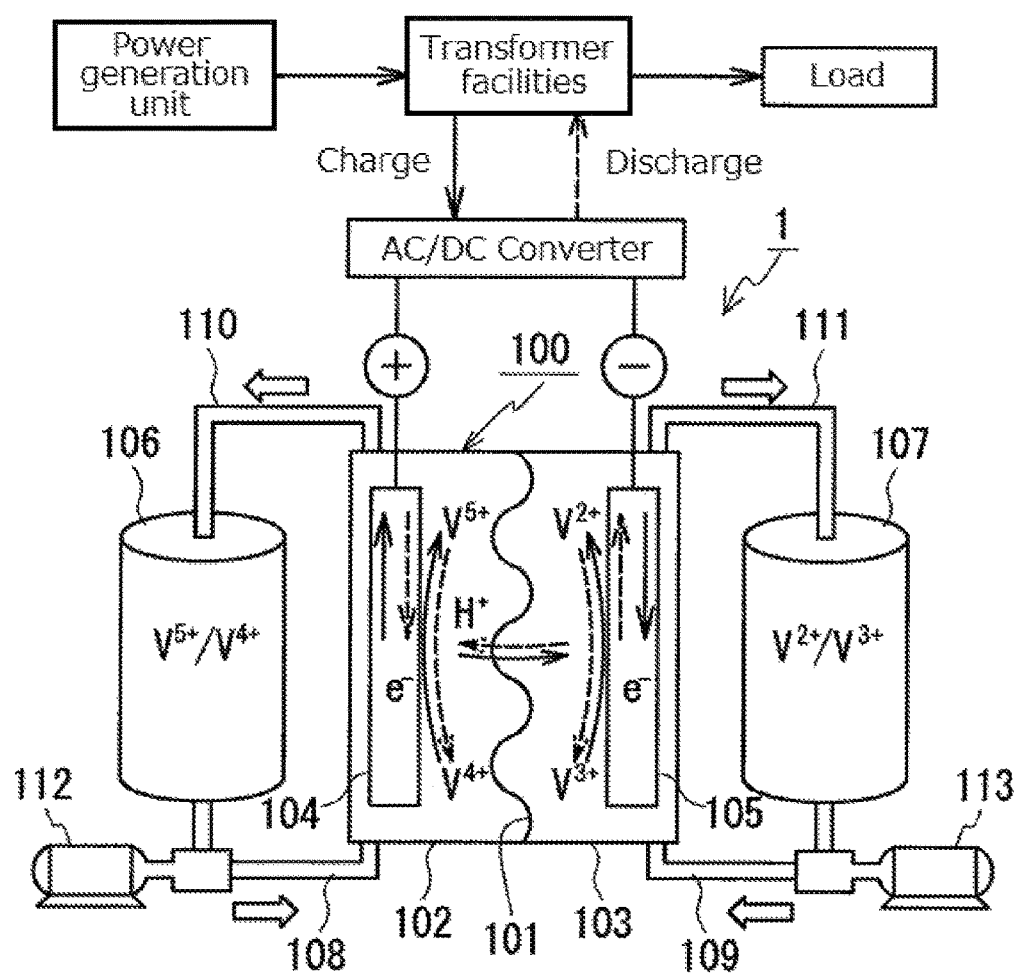
FIG. 6 is an operating principle diagram of a redox flow battery.
Figure 7:
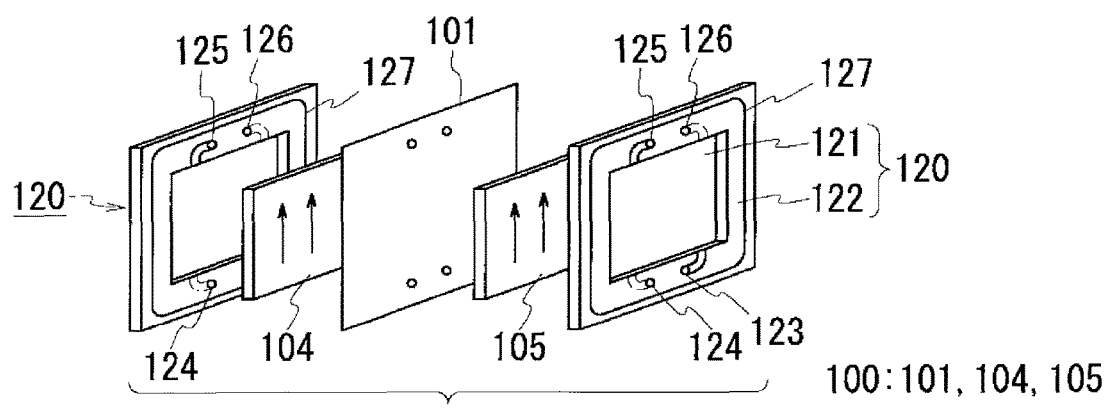
FIG. 7 is a schematic diagram of a cell stack provided in an existing redox flow battery.
Figure 7:
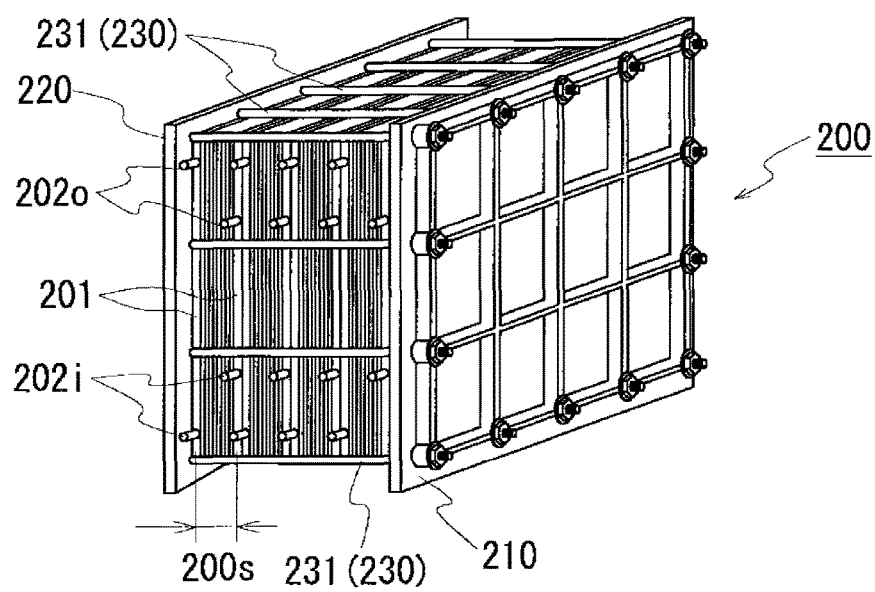

An RF battery according to an embodiment includes, as in the existing RF battery described with reference to FIGS. 6 and 7, a cell stack, a positive electrode circulation mechanism (a tank 106, a supply duct 108, a discharge duct 110, and a pump 112) configured to circulate a positive electrode electrolyte to the cell stack, and a negative electrode circulation mechanism (a tank 107, a supply duct 109, a discharge duct 111, and a pump 113) configured to circulate a negative electrode electrolyte to the cell stack. The RF battery according to the embodiment is mainly characterized by a structure including a current-collecting portion configured to input and output electricity between the cell stack and an external device and its vicinity. Specifically, the RF battery according to the embodiment differs from the existing RF battery in terms of the structure of the supply/discharge plate and the current collector plate. In the embodiment below, a description will be made on the general outline of the cell stack first, and then focusing on the supply/discharge plate and the current collector plate, which are mainly characterizing parts, followed by a description on the related constituent members. The same components as those of the existing battery are designated by the same reference signs as those in FIGS. 6 and 7, and a description thereof will be omitted. In FIG. 6, solid line arrows indicate charge reactions, and dashed line arrows indicate discharge reactions. Although FIG. 6 shows an example of a vanadium RF battery in which vanadium ion aqueous solutions are used as electrolytes for positive and negative electrodes, the electrolytes are not limited to vanadium ion aqueous solutions.

[Cell Stack]

Figure 3:
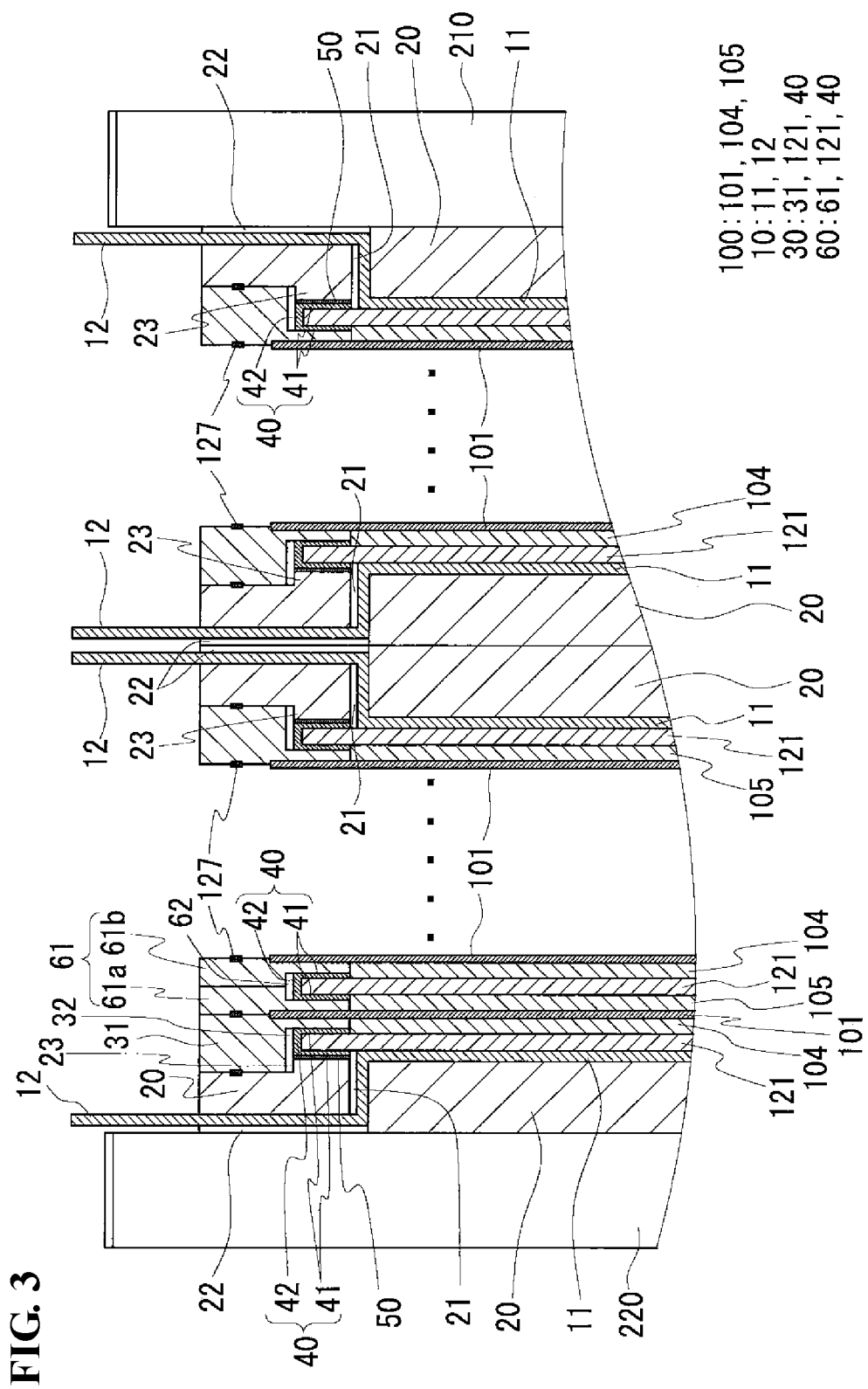
FIG. 3 is a partial sectional view, taken along the line (III)-(III), of the cell stack shown in FIG. 1.

A cell stack 2 shown in FIG. 1 includes a plurality of stacked sub-cell stacks 2s, as in the existing cell stack 200 described with reference to FIG. 7. Each sub-cell stack 2s includes a stacked body formed by stacking a frame assembly, a positive electrode 104, a membrane 101, and a negative electrode 105 in this order, and a space for placing electrodes between frame assemblies constitutes a cell 100. A frame assembly which is located at either end in the sacking directions of the stacked body and in contact with one of a positive electrode 104 and a negative electrode 105 constituting a cell 100 is referred to as an end frame assembly 30 (FIG. 3). A frame assembly which is adjacent to both a positive electrode 104 and a negative electrode 105 is referred to as an intermediate frame assembly 60 (FIG. 3). Furthermore, each sub-cell stack includes current collector plates 10 which are stacked on both sides of the stacked body and each have a terminal portion 12 led out to the outside of the cell 100 (sub-cell stack 2s), and supply/discharge plates 20 which are stacked on the current collector plates 10 at both sides. A plurality of stacked sub-cell stacks 2s are sandwiched between two end plates 210 and 220 and fastened with a fastening mechanism 230, thus constituting the cell stack 2 (FIG. 1). The fastening mechanism 230, for example, includes a fastening shaft 231, nuts 232 and 233 screwed onto both ends of the fastening shaft 231, and a compression spring 234 interposed between the nut 232 and the end plate 210.

Figure 2:
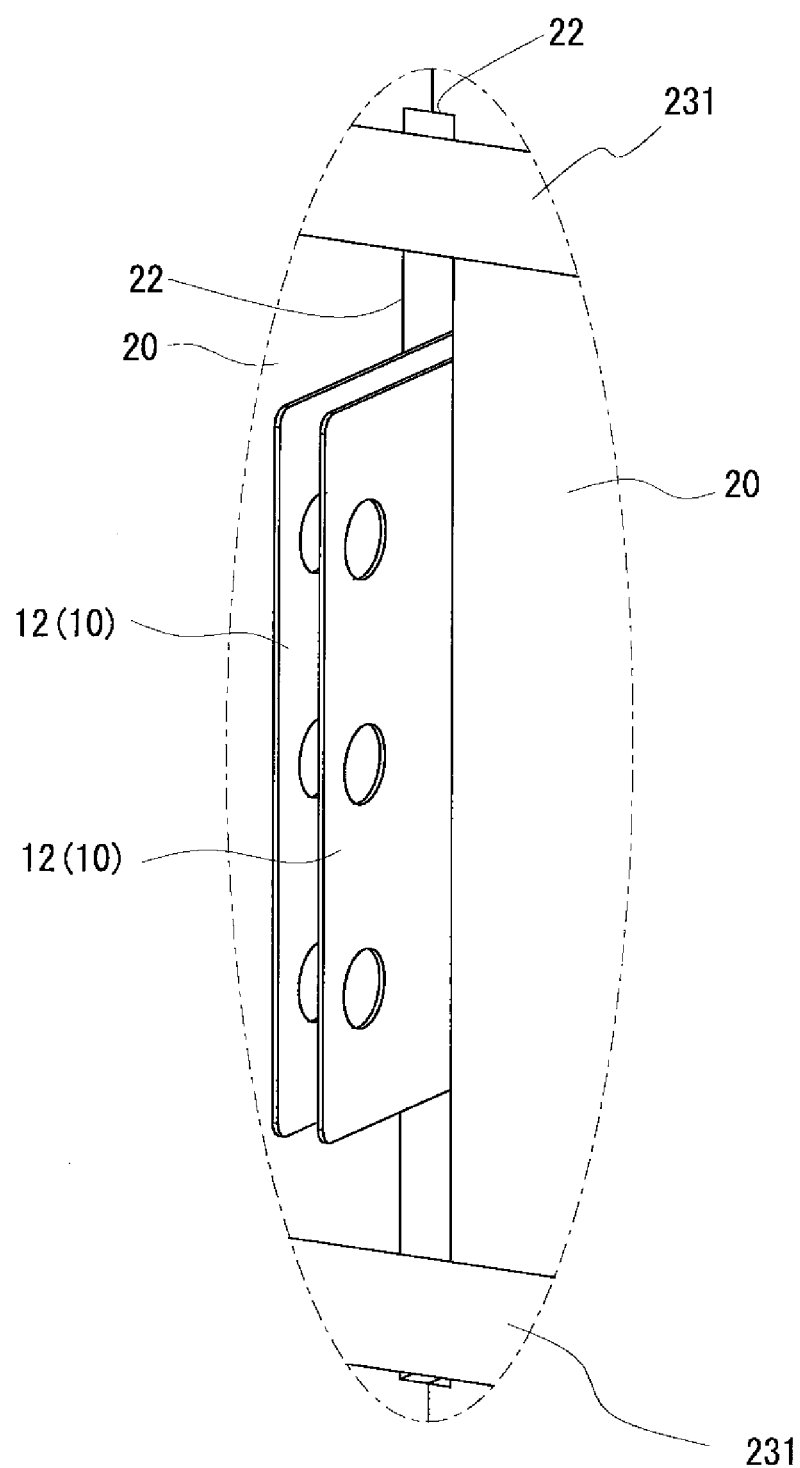
FIG. 2 is an enlarged perspective view of a main part showing a region in the vicinity of terminal portions of current collector plates surrounded by a dashed circle of FIG. 1.

The major difference of the cell stack 2 from the existing one is that, when the cell 100 side of the supply/discharge plate 20 is regarded as a front surface and the side opposite thereto is regarded as a back surface, as shown in FIGS. 1 and 2, the terminal portion 12 of the current collector plate 10 is led out to the back surface side of the supply/discharge plate 20. That is, the terminal portions 12 of the current collector plates 10 disposed on both ends (end plate 210 side and end plate 220 side) of the cell stack 2 are led out between the supply/discharge plate 20 and the end plate 210 or 220, as shown at both ends in FIG. 1. On the other hand, the terminal portions 12 of the current collector plates 10 disposed in the middle of the cell stack 2 (excluding both ends) are led out between two supply/discharge plates 20 in contact with each other, as shown in FIGS. 1 and 2. FIG. 2 is an enlarged view of a portion surrounded by a dashed circle of FIG. 1. Referring to FIGS. 2 and 3, although adjacent terminal portions 12 (lead portions) are usually in contact with each other, for convenience of explanation, the adjacent terminal portions 12 are shown with a certain space therebetween in the drawings. The individual members will be described in detail below.

[Supply/Discharge Plate]

Figure 4:
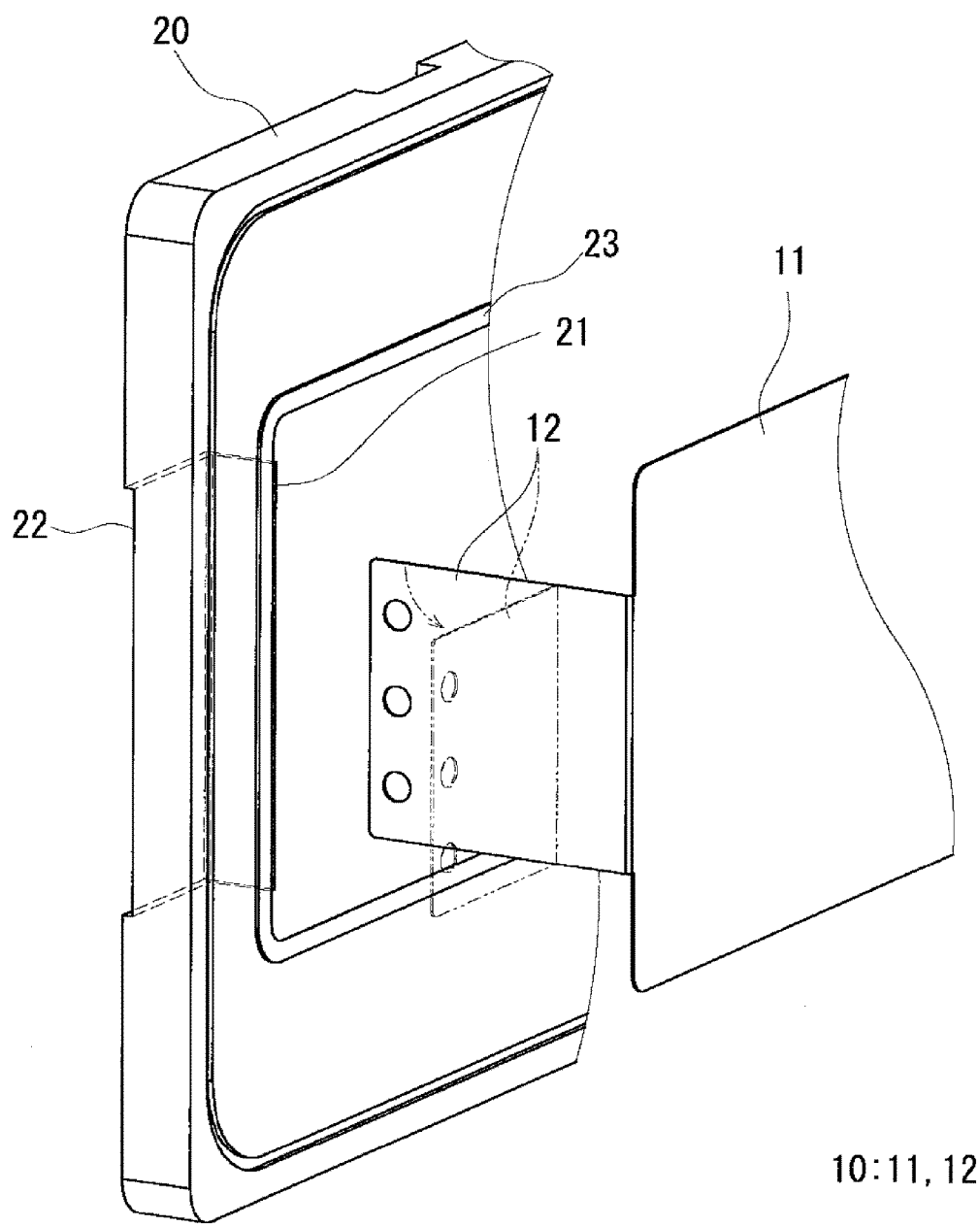
FIG. 4 is a partial exploded perspective view schematically showing a supply/discharge plate and a current collector plate provided in a cell stack.

The supply/discharge plate 20 supplies and discharges electrolytes to and from the cell 100. Although the outline shape of the supply/discharge plate 20 is rectangular in this example, it may be appropriately selected from other shapes, such as a circular shape and a square shape. The size of the supply/discharge plate 20 is the same as that formed by the outline of the end frame assembly 30. The surface of the supply/discharge plate 20 includes a region facing an end frame piece 31 of the end frame assembly 30 and a region other than this (a region facing the bipolar plate 121 exposed from the end frame piece 31) (FIG. 3). As shown in FIGS. 3 and 4, the supply/discharge plate 20 has an insertion hole 21 that passes between the front surface and the back surface. In FIG. 3, for convenience of explanation, only the end plates 210 and 220 are shown by a top view.

(Insertion Hole)

The insertion hole 21 passes between the front surface and the back surface of the supply/discharge plate 20, allows the terminal portion 12 of the current collector plate 10 to be inserted therethrough so that the terminal portion 12 extends from the front surface side to the back surface side of the supply/discharge plate 20 to be led out. The insertion hole 21 has an elongated rectangular shape (FIG. 4). The number of insertion holes 21 may be selected according to the number of terminal portions 12. In this example, the number of insertion holes 21 is one.

Preferably, the insertion hole 21 is formed on the inside of the region of the supply/discharge plate 20 facing the end frame piece 31. In particular, by providing the insertion hole 21 at a position facing the outer edge of the bipolar plate 121 exposed from the end frame piece 31, it is possible to cover the substantially entire surface of the exposed bipolar plate 121 with the body 11 of the current collector plate 10. More specifically, the insertion hole 21 may be provided at least one of on the same side as the pipes 202$i$ and 202$o$ (FIG. 7) and on the opposite side to the pipes 202$i$ and 202$o$ (back side of the sheet of FIG. 7) on the inside of the region facing the periphery of the bipolar plate 121. In this example, the insertion hole 21 is provided on the inside of the region facing the periphery and adjacent to the region facing the periphery on the opposite side to the pipes 202$i$ and 202$o$. In the case where the current collector plate 10 includes two terminal portions 12, the insertion holes 21 may be formed both on the same side as the pipes 202$i$ and 202$o$ and on the opposite side to the pipes 202$i$ and 202$o$ on the inside of the region facing the periphery.

(Recess)

Preferably, the supply/discharge plate 20 has a recess 22 on the back surface thereof, the recess 22 being continuous up to the insertion hole 21 and extending from the insertion hole 21 along the periphery of the supply/discharge plate 20 (FIGS. 3 and 4). In such a case, by partially fitting the terminal portion 12 in the recess 22, the top of the terminal portion 12 can be easily led out to the outside of the periphery at the back surface of the supply/discharge plate 20.

The depth of the recess 22 is preferably larger than the thickness of the terminal portion 12. The depth of the recess 22 is defined as the length of the recess 22 in the front-back direction of the supply/discharge plate 20. In such a case, when the terminal portion 12 is fitted in the recess 22, the terminal portion 12 does not protrude outside from the back surface of the supply/discharge plate 20. When a plurality of sub-cell stacks 2$s$ are stacked as in this example, as shown in FIG. 1 (also FIG. 2 and the central portion in FIG. 3), supply/discharge plates 20 provided on different sub-cell stacks 2$s$ are disposed so as to be in contact with each other. Even in this case, it is possible to bring the terminal portions 12 extending from the frond surface side to the back surface side of the supply/discharge plates 20 into contact with each other without interfering with each other. Thereby, the terminal portions 12 in contact with each other can be easily connected, thus simplifying the connection operation. The width of the recess 22 is larger than the width of the terminal portion 12, and may be equal to the width of the insertion hole 21 or smaller than the width of the insertion hole 21. The width of the recess 22 is defined as a length of the recess 22 in a direction orthogonal to both the front-back direction of the supply/discharge plate 20 and the direction in which the terminal portion 12 is led out.

(Protruding Frame)

Preferably, the supply/discharge plate 20 has a protruding frame 23 on the front surface thereof. In the case where the end frame assembly 30 is provided with a ring-shaped packing 40 that holds the periphery of the bipolar plate 121 as shown in FIG. 3, the protruding frame 23 facilitates positioning of the packing 40. Furthermore, in the case where an elastic sheet 50 is provided between the protruding frame 23 and the packing 40, positioning of the elastic sheet 50 is facilitated. Accordingly, when the sub-cell stack 2$s$ is assembled, the elastic sheet 50 and the packing 40 are easily placed. Furthermore, when the cell stack 2 is assembled, the protruding frame 23 presses the elastic sheet 50 and the packing 40.

The protruding frame 23 is provided on the supply/discharge plate 20 between the region in contact with the current collector plate 10 and the outer peripheral region facing the end frame piece 31. Specifically, preferably, the protruding frame 23 is provided so as to partially adjoin the insertion hole 21. In this example, the protruding frame 23 is formed so as to adjoin the insertion hole 21 and extend along the insertion hole 21 and the periphery of the body 11 of the current collector plate 10. Therefore, it is also possible to use the protruding frame 23 for positioning the body 11 (current collector plate 10).

The width of the protruding frame 23 is preferably set to be larger than the width of each of the packing 40 and the elastic sheet 50 when the cell stack 2 is fastened with a desired fastening force by the fastening mechanism 230 and a pressing force is applied to the packing 40 and the elastic sheet 50. Herein, the width of the protruding frame 23 is defined as a length of the protruding frame 23 in a direction orthogonal to both the peripheral direction of the protruding frame 23 and the front-back direction of the supply/discharge plate 20, and the width of the packing 40 and the elastic sheet 50 is defined as a length along the width of the protruding frame 23. In such a case, in a state in which the cell stack 2 is fastened with a desired fastening force by the fastening mechanism 230, the entire counter surface of each of the packing 40 and the elastic sheet 50 facing the protruding frame 23 can be brought into contact with the protruding frame 23. Accordingly, the pressing force is likely to be applied uniformly to the entire region of each of the packing 40 and the elastic sheet 50. That is, the width of the protruding frame 23 is larger than the width of each of the packing 40 and the elastic sheet 50 before the sub-cell stack 2$s$ (cell stack 2) is fastened.

The height of the protruding frame 23 is preferably set to a value such that, when the cell stack 2 is fastened with a desired fastening force by the fastening mechanism 230 and a pressing force is applied to the packing 40 and the elastic sheet 50, a space is not formed between the supply/discharge plate 20 and the body 11 and between the bipolar plate 121 and the body 11. The height of the protruding frame 23 is defined as a protruding length of the protruding frame 23 in the front-back direction of the supply/discharge plate 20.

(Material)

As the material for the supply/discharge plate 20, a material that does not chemically react with the electrolyte of each electrode and has excellent corrosion resistance and excellent impact resistance may be used. Examples of the material that can be preferably used include resins, such as various fluorine-based resins (e.g., polytetrafluoroethylene), polypropylene, polyethylene, and vinyl chloride (impact-resistant hard vinyl chloride).

(Production Method)

A supply/discharge plate 20 can be produced by cutting a rectangular plate obtained by extrusion to form an insertion hole 21, a recess 22, and a protruding frame 23. For example, the protruding frame 23 can be formed by cutting a region excluding the protruding frame 23 forming region in a face of the extruded rectangular plate.

[Current Collector Plate]

The current collector plate 10 inputs and outputs electricity between the cell 100 and an external device. The current collector plate 10 includes a body 11 having a surface conducted to the bipolar plate 121, and a terminal portion 12 electrically connected to the body 11 and connected to the external device. In this example, the body 11 and the terminal portion 12 are formed integrally.

(Body)

The outline shape of the body 11 can be appropriately selected according to the shape of the bipolar plate 121 to which the body 11 is conducted. In this example, the outline shape of the body 11 is rectangular, but may be circular, square, or the like.

(Terminal Portion)

The terminal portion 12 is formed of a bent piece which is bent into an L shape. The bent piece includes an insertion portion to be placed in the insertion hole 21, the insertion portion being connected to the body 11, and a lead portion extending along the back surface of the supply/discharge plate 20 to be led out to the outside of the sub-cell stack 2s. The insertion portion is connected substantially at right angles to the body 11. The lead portion is partially fitted into the recess 22 of the supply/discharge plate 20. The top of the terminal portion 12 (lead portion) extends along the back surface of the supply/discharge plate 20 and is led out to the outside of the periphery of the supply/discharge plate 20. The top of the terminal portion 12 is provided with a bolt for connection with its adjacent terminal portion 12 or a bolt hole into which a bolt for connecting a lead (not shown) is inserted.

The width of the terminal portion 12 may be equal to the width of the body 11 or smaller than the width of the body 11. In the latter case, the terminal portion 12 is easily bent with respect to the body 11, and the terminal portion 12 itself is easily bent into an L shape. Herein, the width of the terminal portion 12 is defined as the length along the width of the recess 22 and in a direction orthogonal to both the front-back direction of the supply/discharge plate 20 and the direction in which the terminal portion 12 is led out.

The number of terminal portions 12 provided in one current collector plate may be single or plural (e.g., two). In the case where the number of terminal portions 12 is single, the direction in which the terminal portion 12 is led out may be on the same side as the pipes 201i and 202o (FIG. 7) or on the opposite side to the pipes 202i and 202o with the body 11 interposed therebetween. In the former case, since the terminal portion 12 and the pipes 202i and 202o are led out on the same side, the length of the cell stack 2 in the lead-out direction can be decreased compared with the latter case, and it is possible to reduce the size of the cell stack 2. In the latter case, the connection operation between the terminal portion 12 and an external device can be easily performed, which is preferable. The reason for this is that the ducts 108 to 111 (FIG. 6) connected to the pipes 202i and 202o do not hinder the connection operation. Furthermore, even if an electrolyte leaks from any of the joints between the pipes 202i and 202o and the ducts 108 to 111, since the distance between the terminal portion 12 and the electrolyte that has leaked is large, the leaked electrolyte is unlikely to come into contact with the terminal portion 12.

On the other hand, in the case where the number of terminal portions 12 is two, the terminal portions 12 may be led out in opposite directions with the body 11 interposed therebetween. In such a case, in the fabrication process of a sub-cell stack 2s, when an assembly in which a supply/discharge plate 20 and a current collector plate 10 are integrated is fabricated with the body 11 being located on the lower side and the lead portions of the terminal portions 12 being located on the upper side, by holding the two terminal portions 12 and pulling the lead portions in opposite directions, it is possible to prevent the body 11 of the current collector plate 10 from sagging. When a sub-cell stack 2s is fabricated, first, one of the assemblies is placed on an assembly stage such that the back surface thereof is in contact with the assembly stage. A plurality of cells 100 are stacked on the assembly, and another assembly is further placed thereon. At this time, the other assembly is placed with the body 11 being located on the lower side and the lead portions of the terminal portions 12 being located on the upper side. Thus, by holding the two terminal portions 12, it is possible to prevent the central portion of the body 11 from sagging under its own weight. Furthermore, in the case where the number of terminal portions 12 is single and the terminal portion is led out toward one side, the side of the body 11 opposite to the side where the terminal portion 12 lies is likely to sag under its own weight. However, by using the configuration described above, it is possible to prevent the side of the body 11 opposite to the side where the terminal portion 12 lies from sagging.

Regarding specific lead-out directions of the two terminal portions, one terminal portion may be led out toward the same side as the pipes 202i and 202o, and the other terminal portion may be led out toward the opposite side to the pipes 202i and 202o with the body 11 interposed therebetween. When the terminal portions are led out toward the same side as the pipes 202i and 202o, input and output of electricity and charge and discharge of electrolytes can be performed in a consolidated manner on the same side of the cell stack 2. When the terminal portions that input and output electricity are led out toward the opposite side to the pipes 202i and 202o, even if an electrolyte leaks from the vicinity of the pipes 202i and 202o, the electrolyte that has leaked is unlikely to come into contact with the terminal portions.

In this example, the number of terminal portions 12 is single. Furthermore, the terminal portion 12 is led out toward the opposite side to the pipes 202i and 202o with the body 11 interposed therebetween.

(Material)

The current collector plate 10 is preferably made of a metal material having high electrical conductivity, and specifically, copper may be used. In addition, the current collector plate 10 may be made of iron, nickel, chromium, tin, aluminum, or an alloy containing any of these elements as a major component. However, since the current collector plate 10 requires high electrical conductivity and high strength, practically, the current collector plate 10 is made of copper in many cases.

[Assembly of Supply/Discharge Plate and Current Collector Plate]

The assembly of the supply/discharge plate 20 and the current collector plate 10 will be described with reference to FIG. 4. FIG. 4 shows a state in which the supply/discharge plate 20 and the current collector plate 10 are separated before being brought into contact with each other. First, as indicated by the solid line of FIG. 4, the current collector plate 10 including a terminal portion 12 which is bent substantially at right angles to a body 11 and the supply/discharge plate 20 are prepared. The terminal portion 12 is plate-shaped before being bent into an L shape. Next, the terminal portion 12 is inserted into an insertion hole 21 of the supply/discharge plate 20 so that the supply/discharge plate 20 and the body 11 are in contact with each other. In this state, as indicated by the two-dot chain line of FIG. 4, a part of the terminal portion 12 exposed from the insertion hole 21 is bent and fitted into a recess 22 of the supply/discharge plate 20. Thereby, the top of the terminal portion 12 is led out to the outside from the periphery of the supply/discharge plate 20. In such a manner, the terminal portion 12 can extend from the front surface side to the back surface side of the supply/discharge plate 20 to be led out.

[End Frame Assembly]

An end frame assembly 30 includes a bipolar plate 121, an end frame piece 31, and a packing 40. The bipolar plate 121 included in the end frame assembly 30 is in contact with one of a positive electrode 104 and a negative electrode 105. The end frame assembly 30 is configured such that the bipolar plate 121 is supported by one end frame piece 31, and is different from the existing end frame assembly in that a pair of divided frames are not provided.

One surface of the bipolar plate 121 is in contact with one of the positive electrode 104 and the negative electrode 105, and the other surface is electrically connected to the current collector plate 10. In this example, the outline shape of the bipolar plate 121 is rectangular, but may be circular, square, or the like. As the material for the bipolar plate 121, for example, plastic carbon or a carbon plate is used.

The end frame piece 31 is in contact with the front surface (the outer peripheral region) of the supply/discharge plate 20 and places the periphery of the bipolar plate 121 between the end frame piece 31 and the supply/discharge plate 20. The shape of a cross section of the end frame piece 31 is an L shape. The term "cross section" refers to a section taken in the direction orthogonal to the circumferential direction of the end frame piece 31. The counter surface facing the supply/discharge plate 20 of the end frame piece 31 is stepped such that the thickness of the inner periphery decreases, and the stepped surface provides a ring-shaped groove 32 between the end frame piece 31 and the supply/discharge plate 20. The periphery of the bipolar plate 121 is placed in the ring-shaped groove 32. The same material as that of the supply/discharge plate 20 can be used for the end frame piece 31.

The packing 40 is placed in the ring-shaped groove 32 and holds the periphery of the bipolar plate 121, and also is contact-pressed by the end frame piece 31 and the supply/discharge plate 20 (in this example, the protruding frame 23), thus sealing the inside of the ring-shaped groove 32. Specifically, the packing 40 includes a pair of legs 41 that hold the front and back of the periphery of the bipolar plate 121, and a base 42 that joins the legs 41 at the outer edge of the bipolar plate 121. As the material for the packing 40, for example, an elastic material, such as ethylene-propylene-diene rubber (EPDM) or fluororubber, may be used. As the packing 40, for example, the packing described in Japanese Unexamined Patent Application Publication No. 2012-216510 can be used.

[Elastic Sheet]

Preferably, an elastic sheet 50 is interposed between the packing 40 and the protruding frame 23 in the circumferential direction all around the packing 40. That is, preferably, the elastic sheet 50 is interposed over the entire region of the protruding frame 23. In such a case, the lifetime of the packing 40 is prolonged by decreasing the compression set of the packing 40, and the sealing performance by the packing 40 can be maintained over a long period of time. In addition, the packing 40 is easily disposed compared with the case where the elastic sheet 50 is disposed at least partially in the circumferential direction of the packing 40.

The outline shape of the elastic sheet 50 can be appropriately selected according to the outline shape of the packing 40, and for example, may be a rectangular frame-shape, circular frame-shape, square frame-shape, or the like. The cross-sectional shape of the elastic sheet 50 can be appropriately selected, and for example, may be rectangular, circular, square, or the like. When the elastic sheet 50 has a rectangular shape which has a large contact area with the protruding frame 23, the elastic sheet 50 is likely to be stably placed on the protruding frame 23 when the sub-cell stack 2s is assembled. In this example, the outline shape of the elastic sheet 50 is a rectangular frame-shape, and the cross-sectional shape of the elastic sheet 50 is rectangular.

The elastic sheet 50 may be made of the same material as that of the packing 40, for example, EPDM, fluororubber, or the like.

[Intermediate Frame Assembly]

An intermediate frame assembly 60 includes a bipolar plate 121, an intermediate frame piece 61, and a packing 40. The bipolar plate 121 and the packing 40 of the intermediate frame assembly 60 are the same as the bipolar plate 121 and the packing 40 of the end frame assembly 30. However, the bipolar plate 121 included in the intermediate frame assembly 60 differs from that of the end frame assembly 30 in that it is in contact with and sandwiched by a positive electrode 104 and a negative electrode 105. The intermediate frame assembly 60 is the same as the existing intermediate frame assembly and different from the end frame assembly 30 in that a pair of divided frames 61a and 61b hold the bipolar plate 121. That is, the intermediate frame piece 61 includes a pair of divided frames 61a and 61b.

The cross section of each of the divided frames 61a and 61b is substantially L-shaped. The term "cross section" refers to a cross section taken in the direction orthogonal to the circumferential direction of the divided frames 61a and 61b. The divided frames 61a and 61b each surround the bipolar plate 121 and hold the periphery of the bipolar plate 121. The counter surfaces of the divided frames 61a and 61b facing each other in a pressing direction are stepped such that thickness of the inner periphery decreases, and a ring-shaped groove 62 is formed between the counter surfaces of the divided frames 61a and 61b. The periphery of the bipolar plate 121 is placed in the ring-shaped groove 62.

[Operational Advantages]

In the RF battery 1 described above, since the terminal portion 12 is led out from the back surface side of the supply/discharge plate 20, even when an electrolyte leaks between the end frame assembly 30 and the intermediate frame assembly 60, the electrolyte that has leaked is unlikely to come into contact with the terminal portion 12 of the current collector plate 10. The reason for this is that since the supply/discharge plate 20 and the end frame piece 31 are interposed between the terminal portion 12 and the interface between the end frame assembly 30 and the intermediate frame assembly 60, the distance between the electrolyte that has leaked and the terminal portion 12 is large. Furthermore, even when an electrolyte leaks between the supply/discharge plate 20 and the end frame assembly 30, since the distance between the electrolyte that has leaked and the terminal portion 12 is large, the electrolyte that has leaked is unlikely to come into contact with the terminal portion 12 of the current collector plate 10. The reason for this is that the supply/discharge plate 20 is interposed between the terminal portion 12 and the interface between the supply/discharge plate 20 and the end frame piece 31, and the thickness of the supply/discharge plate 20 is generally about several times as large as the thickness of the end frame piece 31.

Since the terminal portion 12 extends from the front surface side to the back surface side of the supply/discharge plate 20 to be led out, the supply/discharge plate 20 is interposed between the terminal portion 12 and the bipolar plate 121. Moreover, it is not necessary to form a recess in the end frame piece 31 such that the terminal portion 12 can be led out to the outside along the front surface of the supply/discharge plate 20, and the end frame piece 31 does not have a partially thin portion in comparison with the existing technique. Accordingly, a sufficient mechanical strength is exhibited against the inward pressing force in the stacking direction of the cell stack 2 by the fastening mechanism 230.

Since the terminal portion 12 extends from the front surface side to the back surface side of the supply/discharge plate 20 to be led out, in the case where a pair of supply/discharge plates 20 provided in different sub-cell stacks 2s are placed such that the back surfaces thereof are in contact with each other, interposition, such as two supply/discharge plates, which is interposed in the existing technique, does not lie between the terminal portions 12 led out from the back surfaces of the supply/discharge plates 20. Therefore, the terminal portions 12 can be brought into contact with each other, and the connection operation of the terminal portions 12 can be simplified.

Since the terminal portion 12 extends from the front surface side to the back surface side of the of the supply/discharge plate 20 to be led out, it is not necessary to form a recess in the end frame piece 31 and lead out the terminal portion 12 to the outside along the front surface of the supply/discharge plate 20. That is, it is possible to bring the entire circumference of the end frame piece 12 into contact with the supply/discharge plate 20. Therefore, it is possible to apply the pressing force uniformly in the circumferential direction all around the packing 40.

Modification Example

Figure 5:
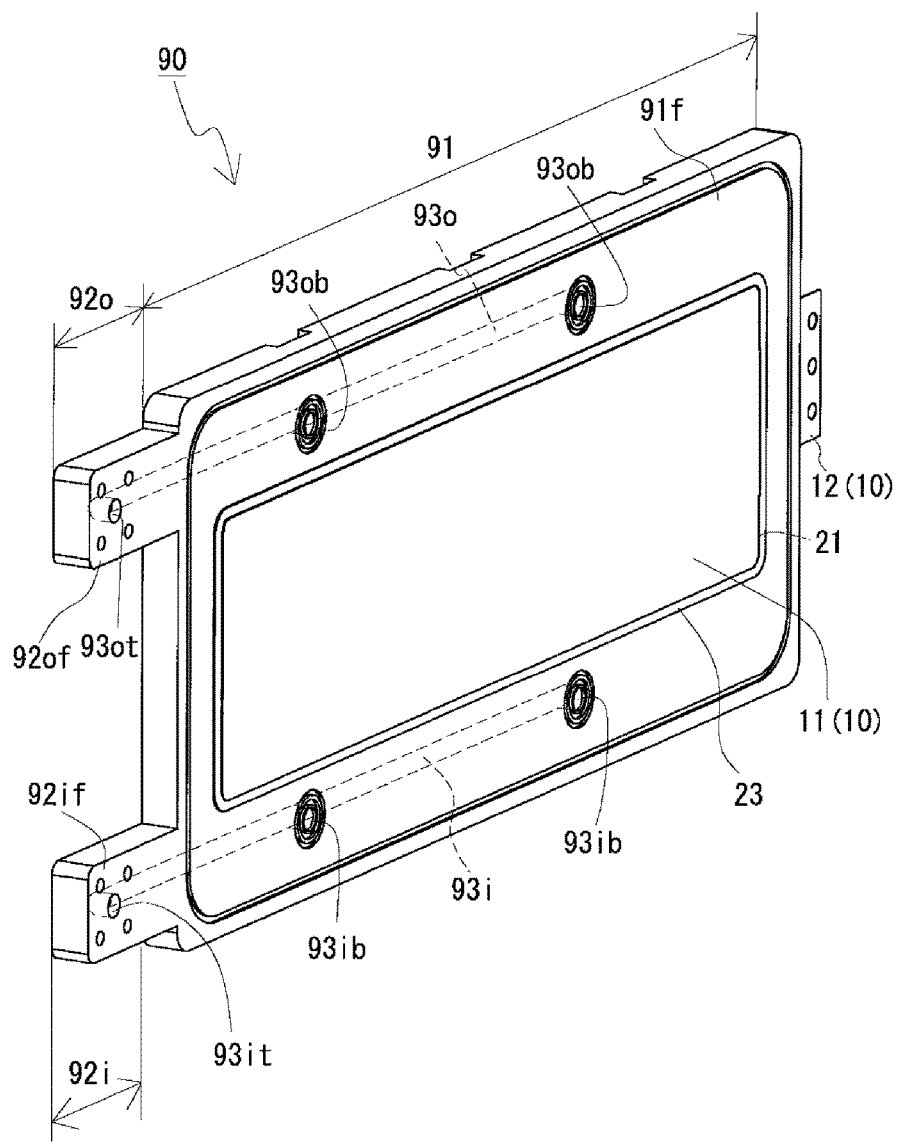
FIG. 5 is a schematic perspective view showing a supply/discharge plate in a modification example of an embodiment.

As a modification example, as shown in FIG. 5, a supply/discharge plate 90 may be configured to include a body 91, a protrusion for supply 92i, a protrusion for discharge 92o, an electrolyte supply passage 93i, and an electrolyte discharge passage 93o. The body 91 has a counter surface 91f facing a cell 100. The protrusion for supply 92i is formed in integration with the body 91 and so as to protrude from the periphery of the body 91 toward the outside, and has a connecting surface 92if to which a supply duct 108 (109) that supplies an electrolyte of one electrode from the outside (electrolyte tank 106 (107)) is connected. The protrusion for discharge 92o is formed, similar to the protrusion for supply 92i, in integration with the body 91 and so as to protrude from the periphery of the body 91 toward the outside, and has a connecting surface 92of to which a discharge duct 111(110) that discharges an electrolyte of the other electrode to the outside (electrolyte tank 107(106)) is connected. The electrolyte supply passage 93i extends from the protrusion for supply 92i to the body 91 and has a protrusion-side supply opening 93it opened in the connecting surface 92if of the protrusion for supply 92i and body-side supply openings 93ib opened in the counter surface 91f of the body 91. The electrolyte discharge passage 93o extends from the body 91 to the protrusion for discharge 92o and has body-side discharge openings 93ob opened in the counter surface 91f of the body 91 and a protrusion-side discharge opening 93ot opened in the connecting surface 92of of the protrusion for discharge 92o. An insertion hole 21 is provided in the body 91 of the supply/discharge plate 90 on the side opposite the protrusions 92i and 92o so as to pass between the front surface and the back surface. A terminal portion 12 of a current collector plate 10 passes through the insertion hole 21 and extends from the front surface side to the back surface side of the supply/discharge plate 90 to be led out.

In the embodiments described above, the cell stack is configured to include a plurality of stacked sub-cell stacks, each including a plurality of cells. However, the number of cells may be single, and the number of sub-cell stacks may be single. That is, the cell stack may be configured to include one sub-cell stack including a single cell, one sub-cell stack including a plurality of cells, or a plurality of stacked sub-cell stacks, each including a single cell.

Furthermore, in the embodiments described above, in each of the end frame assembly and the intermediate frame assembly, the packing is interposed between the bipolar plate and the frame. However, it is also possible to use an end frame assembly or an intermediate frame assembly in which the periphery of a bipolar plate is sandwiched between a pair of frame pieces, the frame portions are welded to each other using an organic solvent to form a frame, and the frame and the bipolar plate are welded to each other, as in the existing frame assembly described with reference to FIG. 7.

INDUSTRIAL APPLICABILITY

Flow batteries according to the present invention can be suitably used, with respect to new energy power generation, such as solar power generation or wind power generation, for the purpose of stabilizing variation of power output, storing generated power during oversupply, leveling load, and the like. Flow batteries according to the present invention can also be provided in a general power plant and used as large-capacity storage batteries as countermeasures against voltage sag/power failure and for the purpose of leveling load. Furthermore, a supply/discharge plate of a flow battery according to the present invention can be suitably used for a flow battery of the present invention, such as an RF battery.

REFERENCE SIGNS LIST 1 redox flow (RF) battery
2 cell stack 2s sub-cell stack
10 current collector plate 11 body 12 terminal portion
20 supply/discharge plate 21 insertion hole 22 recess 23 protruding frame
30 end frame assembly 31 end frame piece 32 ring-shaped groove
40 packing 41 leg 42 base
50 elastic sheet
60 intermediate frame assembly
61 intermediate frame piece 61a, 61b divided frame 62 ring-shaped groove
90 supply/discharge plate 91 body 91f counter surface
92i protrusion for supply 92if connecting surface
92o protrusion for discharge 92of connecting surface
93i electrolyte supply passage
93ib body-side supply opening 93it protrusion-side supply opening 93o electrolyte discharge passage
93ob body-side discharge opening 93ot protrusion-side discharge opening
100 cell
101 membrane 102 positive electrode cell 103 negative electrode cell
104 positive electrode 105 negative electrode
106 positive electrode electrolyte tank 107 negative electrode electrolyte tank
108, 109 supply duct 110, 111 discharge duct
112, 113 pump
120 frame assembly 121 bipolar plate 122 frame piece
123, 124 liquid supply manifold 125, 126 liquid discharge manifold
127 sealing member
200 cell stack 200s sub-cell stack
201 supply/discharge plate 202i supply pipe 202o discharge pipe
210, 220 end plate
230 fastening mechanism
231 fastening shaft 232, 233 nut 234 compression spring

The invention claimed is:

1. A flow battery comprising:
    a cell;
    a bipolar plate which is in contact with one of a positive electrode and a negative electrode constituting the cell;
    a current collector plate which has a terminal portion that is led out to the outside of the cell, and is electrically connected to the bipolar plate; and
    a supply/discharge plate which is stacked on the current collector plate and supplies and discharges electrolytes to and from the cell,
    wherein, when the side of the supply/discharge plate facing the current collector plate is regarded as a front surface and the side opposite thereto is regarded as a back surface, the supply/discharge plate has an insertion hole which passes between the front surface and the back surface thereof and into which the terminal portion is inserted; and
    the terminal portion passes through the insertion hole and extends from the front surface side to the back surface side of the supply/discharge plate to be led out.

2. The flow battery according to claim 1,
    wherein the cell is provided in a plurality, and the flow battery includes a pair of the supply/discharge plates which are in contact with each other between the plurality of the cells and supply and discharge electrolytes to and from different cells, and
    wherein the terminal portions led out through the insertion holes of the supply/discharge plates are in contact with each other.

3. The flow battery according to claim 1,
    wherein the supply/discharge plate has a recess formed on the back surface thereof, the recess being continuous up to the insertion hole and extending from the insertion hole to the periphery of the supply/discharge plate; and
    the terminal portion is partially fitted in the recess, and a top of the terminal portion is led out to the outside of the periphery.

4. The flow battery according to claim 1,
    wherein a frame that forms a ring-shaped groove for placing the periphery of the bipolar plate is provided between the supply/discharge plate and the bipolar plate; and
    a ring-shaped packing composed of an elastic material is placed in the ring-shaped groove and contact-pressed by the frame and the supply/discharge plate, the packing holding the periphery of the bipolar plate.

5. The flow battery according to claim 4,
    wherein the supply/discharge plate is provided with a protruding frame formed on the front surface, the protruding frame positioning the packing.

6. The flow battery according to claim 5,
    wherein an elastic sheet is interposed between the packing and the protruding frame in the circumferential direction all around the packing.

7. A supply/discharge plate of a flow battery, which is stacked on a current collector plate having a terminal portion that inputs and outputs electricity between a cell and an external device and supplies and discharges electrolytes to and from the cell,
    wherein, when the side of the supply/discharge plate facing the current collector plate is regarded as a front surface and the side opposite thereto is regarded as a back surface, the supply/discharge plate has an insertion hole which passes between the front surface and the back surface thereof and into which the terminal portion is inserted so as to extend from the front surface side to the back surface side to be led out.

* * * * *